(12) United States Patent
Hayashi et al.

(10) Patent No.: US 8,206,467 B2
(45) Date of Patent: Jun. 26, 2012

(54) METHOD FOR MANUFACTURING A SOLID ELECTROLYTIC CAPACITOR

(75) Inventors: Hiroki Hayashi, Hirakata (JP); Mutsumi Yano, Hirakata (JP); Yasumi Kobayashi, Yawata (JP); Kazuhiro Takatani, Amagasaki (JP); Kazuhito Kikuchi, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 13/053,757

(22) Filed: Mar. 22, 2011

(65) Prior Publication Data

US 2011/0232056 A1 Sep. 29, 2011

(30) Foreign Application Priority Data

Mar. 24, 2010 (JP) .................................. 2010-68637
Jul. 22, 2010 (JP) ................................. 2010-164721

(51) Int. Cl.
*H01G 9/00* (2006.01)
(52) U.S. Cl. ....................................................... 29/25.03
(58) Field of Classification Search .................. 29/25.03
See application file for complete search history.

(56) References Cited

U.S. PATENT DOCUMENTS

| 2001/0011635 | A1* | 8/2001 | Terada et al. | 204/194 |
| 2005/0036272 | A1* | 2/2005 | Suda et al. | 361/508 |
| 2008/0259528 | A1* | 10/2008 | Fujita et al. | 361/528 |

FOREIGN PATENT DOCUMENTS

| JP | H11-026310 A | 1/1999 |
| JP | H11-191518 A | 7/1999 |
| JP | 2005-159154 A | 6/2005 |
| JP | 2005-322917 A | 11/2005 |
| JP | 2006-32530 A | 2/2006 |
| JP | 2006-121000 A | 5/2006 |
| JP | 2007-103406 A | 4/2007 |
| JP | 2010-010271 A | 1/2010 |

* cited by examiner

*Primary Examiner* — Seahvosh Nikmanesh
(74) *Attorney, Agent, or Firm* — Marvin A. Motsenbocker; Mots Law, PLLC

(57) ABSTRACT

A method includes the following steps: forming a porous anode body using powder of valve metal or an alloy thereof; forming a dielectric layer on the surface of the anode body; soaking the anode body having the dielectric layer in a liquid containing a conductive-polymer monomer, thereby making the monomer adhere to the dielectric layer of the anode body; forming a first conductive polymer layer by soaking the anode body having the monomer adhered thereto in an oxidizing agent solution, thereby polymerizing the monomer by liquid-phase chemical polymerization; forming a second conductive polymer layer by bringing the conductive-polymer monomer into contact with the surface of the anode body having the first conductive polymer layer in a gas phase, thereby polymerizing the monomer by gas-phase chemical polymerization; and forming a third conductive polymer layer by soaking the anode body having the second conductive polymer layer in a liquid containing a monomer of a conductive polymer layer, thereby polymerizing the monomer by electrolytic polymerization.

6 Claims, 5 Drawing Sheets

METHOD FOR MANUFACTURING A SOLID ELECTROLYTIC CAPACITOR

BACKGROUND OF THE INVENTION

1. Field of the Invention

The present invention relates to a method for manufacturing a solid electrolytic capacitor having a porous anode body made of powder of valve metal or an alloy thereof.

2. Description of Related Art

Solid electrolytic capacitors generally have an anode body, a dielectric layer, an electrolyte layer, and a cathode layer which are formed as follows. The anode body is formed by sintering valve metal powder such as niobium (Nb) or tantalum (Ta). The dielectric layer is formed on the anode body by anodizing its surface. The electrolyte layer and the cathode layer are formed in that order on the dielectric layer.

In recent years, most electrolyte layers are made of conductive polymers because of their high conductivity and their ability to reduce an equivalent series resistance (ESR).

One proposed conductive polymer layer used as the electrolyte layer of a solid electrolytic capacitor has a laminated structure of first and second conductive polymer layers of polypyrrole. The first and second conductive polymer layers are formed by chemical polymerization and by electrolytic polymerization, respectively (see, for example, Japanese Patent Unexamined Publication Nos. 2006-32530 and H11-191518).

In the case of chemical polymerization, a conductive polymer layer is generally formed as follows. An anode body having a dielectric layer is soaked in an oxidizing agent solution, and then is either brought into contact with the vapor of a conductive-polymer monomer or soaked in a solution of the monomer, thereby polymerizing the monomer. In the case of electrolytic polymerization, on the other hand, a conductive polymer layer is formed by applying voltage in a monomer solution to the first conductive polymer layer as an electrode, which has been formed by chemical polymerization or other methods.

Japanese Patent Unexamined Publication No. 2005-322917 proposes soaking an anode body having a dielectric layer in a mixture solution containing a conductive-polymer monomer and an oxidizing agent, and polymerizing the monomer by chemical polymerization.

Japanese Patent Unexamined Publication No. H11-26310 proposes alternate application of liquid-phase chemical polymerization and gas-phase chemical polymerization to an anode body having a dielectric layer so as to form a conductive polymer layer.

In terms of increasing the capacitance of a solid electrolytic capacitor, it is preferable that the anode body has a large surface area. To achieve a large surface area, attempts have been made to make the valve metal powder used for the anode body as fine as, for example, having a CV value of not less than 120,000 μF·V/g. The CV value is the product of the electrolysis voltage and the capacity of the anode body having a dielectric layer. In the above-mentioned conventional techniques, however, in the case of using such fine metal powder, the conductive polymer layer cannot be densely formed in small spaces or pores of the anode body. As a result, it is impossible to manufacture a solid electrolytic capacitor having a large capacitance.

SUMMARY OF THE INVENTION

An object of the present invention is to provide a method for manufacturing a solid electrolytic capacitor having a large capacitance.

The present invention is directed to provide a method for manufacturing a solid electrolytic capacitor, including the steps of forming a porous anode body; forming a dielectric layer on a surface of the anode body; soaking the anode body having the dielectric layer in a liquid containing a conductive-polymer monomer; forming a first conductive polymer layer on the dielectric layer by soaking the anode body that has been soaked in the liquid containing the conductive-polymer monomer in an oxidizing agent solution, thereby polymerizing the monomer by liquid-phase chemical polymerization; forming a second conductive polymer layer on the first conductive polymer layer by holding the anode body having the first conductive polymer layer in a vapor of a conductive-polymer monomer, thereby polymerizing the monomer by gas-phase chemical polymerization; and forming a third conductive polymer layer on the second conductive polymer layer by soaking the anode body having the second conductive polymer layer in a liquid containing a conductive-polymer monomer, thereby polymerizing the monomer by electrolytic polymerization.

According to the present invention, it is possible to manufacture a solid electrolytic capacitor having a large capacitance.

In the present invention, it is preferable to form a coupling agent layer on the dielectric layer. The coupling agent layer allows the first conductive polymer layer to be uniform and dense. This results in the manufacture of a solid electrolytic capacitor having a large capacitance.

In the present invention, the anode body is preferably made of powder of valve metal or an alloy thereof having a CV value of not less than 145,000 μF·V/g.

After sintering, the anode body has a density preferably not less than 5.0 g/cm$^3$, more preferably not less than 5.4 g/cm$^3$, further more preferably not less than 5.5 g/cm$^3$, and further still more preferably not less than 5.6 g/cm$^3$.

In the step of forming the first conductive polymer layer, a concentration of the monomer in the monomer-containing liquid is preferably in the range of 1 to 100% by mass, and more preferably 20 to 100% by mass.

Effect of the Invention

According to the present invention, it is possible to manufacture a solid electrolytic capacitor having a large capacitance.

DETAILED DESCRIPTION OF THE PREFERRED EXAMPLES

Figure 5:
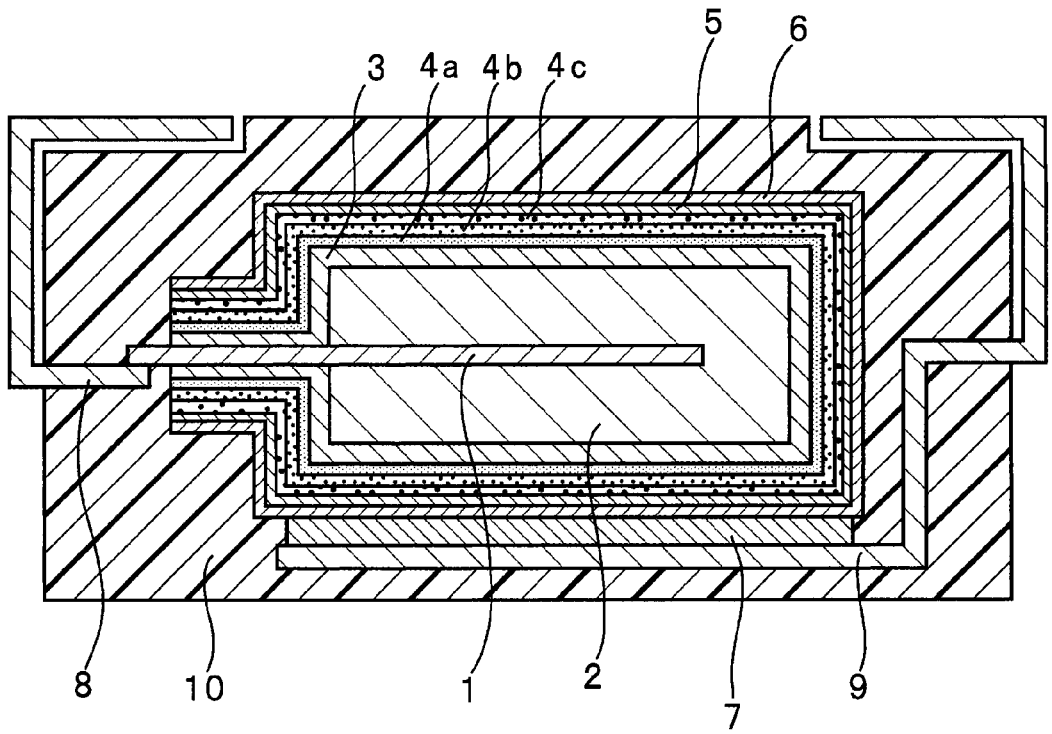
FIG. 5 is a schematic sectional view of the solid electrolytic capacitor according to an embodiment of the present invention.

FIG. 5 is a schematic sectional view of the solid electrolytic capacitor according to an embodiment of the present invention.

As shown in FIG. 5, the solid electrolytic capacitor includes an anode body 2 in which an anode lead 1 is embedded. The anode body 2 is formed by molding powder of valve metal or an alloy mainly composed of a valve metal, and then sintering the compact. Therefore, the anode body 2 is a porous body. Although not illustrated in FIG. 5, this porous body has a large number of fine pores communicated with outside. The anode body 2 formed as above in the present embodiment has a substantially rectangular parallelepiped shape.

The valve metal used for the anode body 2 is not limited as long as it is used in solid electrolytic capacitors. Examples of the value metal include tantalum, niobium, titanium, aluminum, hafnium, zirconium, zinc, tungsten, bismuth, and antimony. Particularly preferred among them are tantalum, niobium, titanium, and aluminum because of their high permittivity of oxides, and their ready availability. The alloy mainly composed of a valve metal can be either an alloy of two or more valve metals including, for example, tantalum and niobium, or an alloy of a valve metal and another metal. In the latter case, the valve metal preferably accounts for not less than 50 at %.

The powder of valve metal or an alloy thereof which forms the anode body 2 has a CV value of preferably not less than 100,000 µF·V/g, more preferably not less than 120,000 µF·V/g, further more preferably not less than 140,000 µF·V/g, and further still more preferably not less than 160,000 µF·V/g. In general, the higher the CV value, the smaller the particle size of the powder. Thus, the small particle size allows the anode body to have a large surface area, thereby obtaining a high capacitance.

In the present invention, as described above, the density of the anode body after sintering is preferably not less than 5.0 g/cm$^3$, more preferably not less than 5.4 g/cm$^3$, further more preferably not less than 5.5 g/cm$^3$, and further still more preferably not less than 5.6 g/cm$^3$.

As described above, in general, in the case of using a high-density sintered body made of powder having a large CV value, the anode body has small-diameter pores. In the present invention, however, as will be described later, even when the anode body has small-diameter pores, uniform and dense conductive polymer layers formed on the surface of the anode body allow the manufacture of a solid electrolytic capacitor having a large capacitance.

The solid electrolytic capacitor further includes a dielectric layer 3 on the surface of the anode body 2. The dielectric layer 3 is also formed on the surfaces of the pores of the anode body 2, but is not illustrated in FIG. 5 which schematically shows the dielectric layer 3 formed on the outer surface of the anode body 2. The dielectric layer 3 can be formed by oxidizing the anode body 2 by, for example, anodizing.

The solid electrolytic capacitor further includes first, second, and third conductive polymer layers 4a, 4b, and 4c formed in that order on the surface of the dielectric layer 3. The first, second, and third conductive polymer layers 4a, 4b, and 4c are formed by liquid-phase chemical polymerization, gas-phase chemical polymerization, and electrolytic polymerization, respectively.

The solid electrolytic capacitor further includes a carbon layer 5 and a silver layer 6 formed in that order on the third conductive polymer layer 4c. The carbon layer 5 and the silver layer 6 are formed by applying carbon paste and silver paste, respectively, and together form a cathode layer.

The solid electrolytic capacitor further includes a conductive adhesive layer 7 on the silver layer 6 so as to connect the silver layer 6 to a cathode terminal 9. The anode lead 1 is connected to an anode terminal 8. The solid electrolytic capacitor further includes a resin mold outer package 10, from which the end of the anode terminal 8 and the end of the cathode terminal 9 are led outside.

The solid electrolytic capacitor of the present embodiment is formed as described above.

Figure 6:
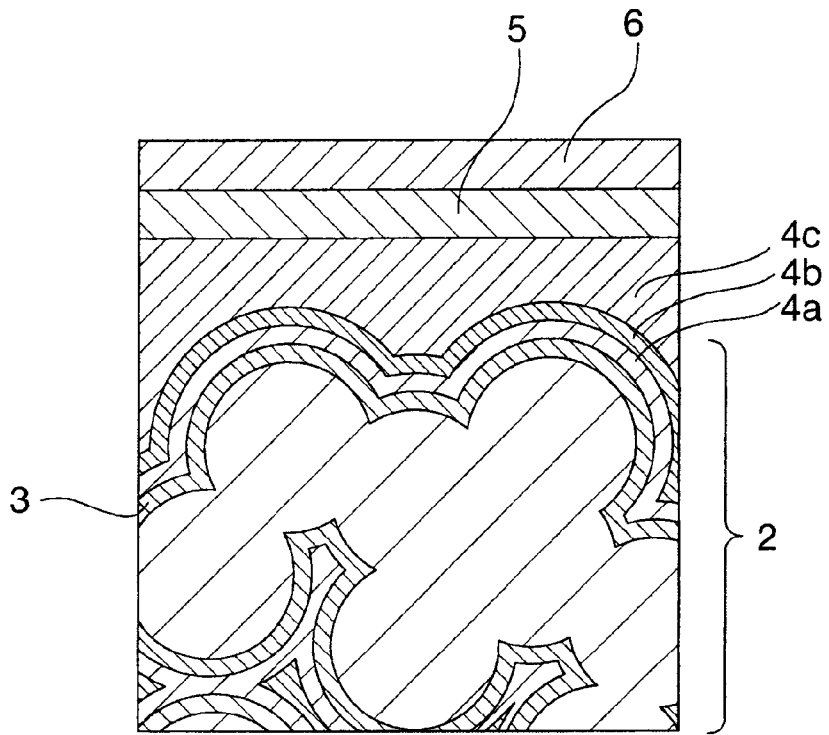
FIG. 6 is an enlarged schematic sectional view of the surface of an anode body and its vicinity in the solid electrolytic capacitor shown in FIG. 5.

FIG. 6 is an enlarged schematic sectional view of the surface of the anode body 2 and its vicinity in the solid electrolytic capacitor shown in FIG. 5.

As shown in FIG. 6, the anode body 2 is a porous body, and has fine pores inside. On the surface of the anode body 2 are formed the dielectric layer 3, and the first, second, and third conductive polymer layers 4a, 4b, and 4c in that order.

On the third conductive polymer layer 4c which is the outer surface layer of the anode body 2, the carbon layer 5 and the silver layer 6 are formed in that order.

In the present invention, the first, second, and third conductive polymer layers 4a, 4b, and 4c are formed by liquid-phase chemical polymerization, gas-phase chemical polymerization, and electrolytic polymerization, respectively.

In the present invention, it is preferable to form a coupling agent layer on the dielectric layer 3 formed on the surface of the anode body 2, and then to form the first conductive polymer layer 4a on the coupling agent layer. Thus, the coupling agent layer is formed between the dielectric layer 3 and the first conductive polymer layer 4a although not illustrated in FIGS. 5 and 6.

The coupling agent layer increases the affinity of the monomer in the conductive polymer layer, allowing the monomer to adhere uniformly and densely to the surface of the dielectric layer 3 on the anode body 2. As a result, the first conductive polymer layer can be formed uniformly and densely.

The coupling agent layer can be formed by making the dielectric layer 3 brought into contact with a coupling agent-containing solution. More specifically, the coupling agent layer can be formed by soaking the anode body having the dielectric layer in a coupling agent-containing solution, then taking out the anode body, and drying it for a predetermined time.

A concentration of the coupling agent in the coupling agent-containing solution is not particularly limited, but is preferably in the range of 0.1 to 10% by mass.

Figure 1:
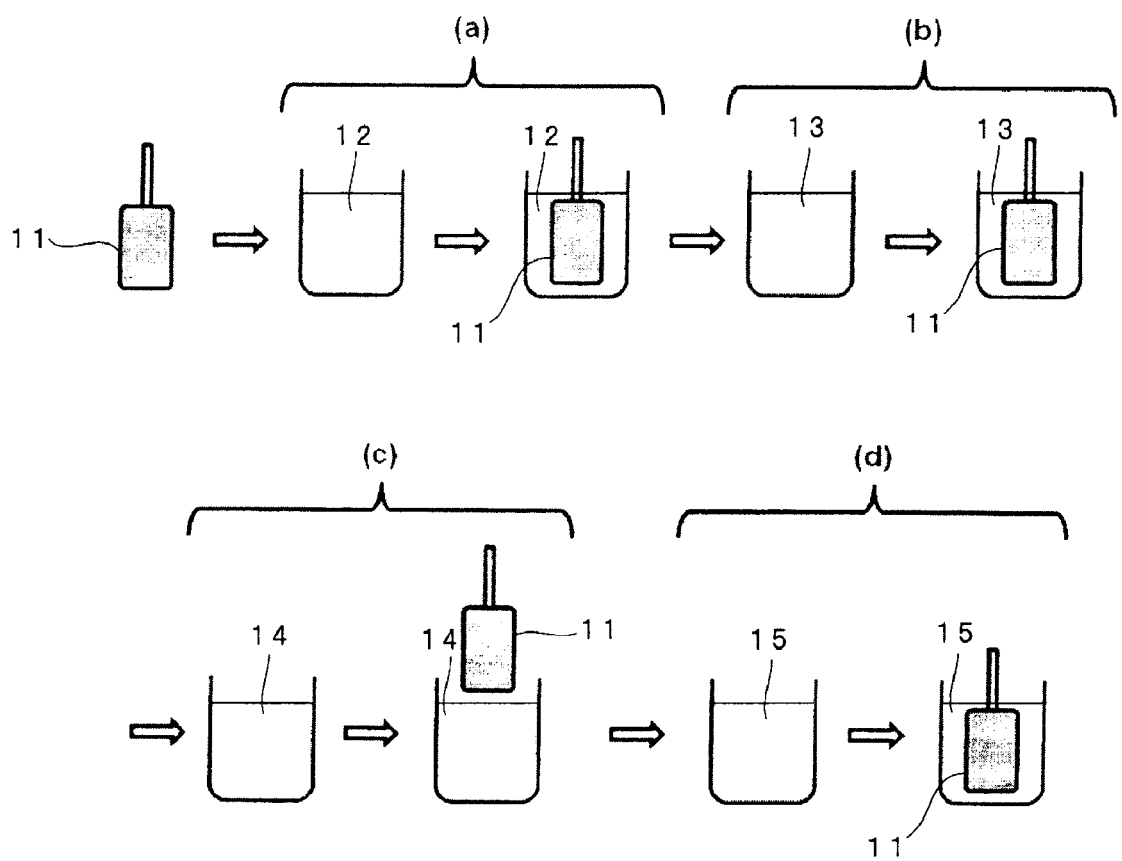
FIG. 1 is a schematic diagram of a method for manufacturing a solid electrolytic capacitor according to an embodiment of the present invention.

FIG. 1 is a schematic diagram of a method for manufacturing the solid electrolytic capacitor according to an embodiment of the present invention.

Referring to FIG. 1, the solid electrolytic capacitor includes an anode body 11 having a dielectric layer on its surface. The dielectric layer can be formed by, for example, anodizing the anode body 11 in an aqueous phosphoric solution.

In the present embodiment, the solid electrolytic capacitor includes the coupling agent layer formed on the dielectric layer as described above.

In a step (a), a liquid 12 is prepared which contains a conductive-polymer monomer, and the anode body 11 having the dielectric layer and the coupling agent layer is soaked in the liquid 12.

A concentration of the monomer in the monomer-containing liquid 12 is preferably in the range of 1 to 100% by mass, more preferably 20 to 100% by mass, further more preferably 50 to 100% by mass, and further still more preferably 90 to 100% by mass.

When soaked in the monomer-containing liquid 12, the anode body 11 is preferably held in such a manner that its top surface is flush with or lower than the liquid level.

In the present embodiment, the coupling agent layer formed on the dielectric layer increases the affinity of the monomer. This allows the monomer-containing liquid to be easily introduced into the pores of the anode body 11 when the anode body 11 is soaked therein. After the soak, the anode body 11 is raised from the monomer-containing liquid 12. Then, the anode body 11 may be dried to open its pores which are closed by the monomer-containing liquid 12.

In a step (b), an oxidizing agent solution 13 containing an oxidizing agent is prepared. The oxidizing agent is not particularly limited as long as it can initiate the polymerization of the monomer. Examples of the oxidizing agent include protonic acids and transition metal halides. Examples of such protonic acids include hydrochloric acid, sulfuric acid, hydrofluoric acid, perchloric acid, trichloroacetic acid, trifluoroacetic acid, and phosphoric acid. Examples of such transition metal halides include peroxides, halogens, and ferric chlorides. By soaking the anode body 11 in the oxidizing agent solution 13, the monomer adhered on the anode body 11 is brought into contact with the oxidizing agent solution, and then is oxidatively polymerized. As a result, the first conductive polymer layer is formed on the inner and outer surfaces of the anode body.

A concentration of the oxidizing agent in the oxidizing agent solution 13 is not particularly limited, but can be in the range of 0.5 to 20 mol/L. A temperature of the oxidizing agent solution 13 is not particularly limited, but is preferably in the range of 1 to 90° C., and more preferably 1 to 70° C. The temperature of the oxidizing agent solution can be properly determined based on the types of the monomer and the oxidizing agent to be used, or other conditions.

Next, the anode body 11 is raised from the oxidizing agent solution 13, and dried, when necessary, to open its pores closed by the oxidizing agent solution. The length of the drying process is not particularly limited, but is preferably up to 30 minutes, and more preferably up to 10 minutes.

In a step (c), a liquid 14 is prepared which contains a conductive-polymer monomer. This monomer can be either the same monomer as contained in the liquid 12 used in the step (a) or a different monomer. It is, however, preferable to use the same monomer because they are generally polymerized by the same oxidizing agent.

The anode body 11 raised from the oxidizing agent solution is held above the monomer-containing liquid 14, and then the monomer is evaporated from the monomer-containing liquid 14 so as to bring the surface of anode body 11 into contact with the vapor of the monomer. The anode body 11 is preferably held near the liquid level of the monomer-containing liquid 14. The anode body 11 has the oxidizing agent adhered to its surface, and this oxidizing agent comes into contact with the monomer vapor, allowing the monomer to be polymerized by gas-phase chemical polymerization. As a result, a second conductive polymer layer is formed.

A concentration of the monomer in the monomer-containing liquid 14 is not particularly limited as long as it can generate monomer vapor. Alternatively, it is possible to use a liquid composed of 100% monomer with no solvent.

A temperature of the monomer-containing liquid 14 is not particularly limited, but is preferably in the range of 20 to 60° C., and more preferably 30 to 60° C.

In a step (d), a liquid 15 is prepared which contains a conductive-polymer monomer. This monomer can be either the same monomer as contained in the liquid 12 or 14 or a different monomer. The monomer is required to be able to be electrolytically polymerized because it is polymerized by electrolytic polymerization in the step (d). The anode body 11 having the second conductive polymer layer is soaked in the monomer-containing liquid 15, and voltage is applied to the first and second conductive polymer layers as electrodes so as to polymerize the monomer contained in the liquid 15 by electrolytic polymerization. As a result, a third conductive polymer layer is formed.

Conductive polymers exhibit metallic properties to greatly increase their conductivity when doped with an appropriate material. Such a material to be doped is called a dopant. Adding a dopant agent to the liquid 15 in the step of forming the conductive polymer layer allows the conductive polymer layer to be doped with the dopant, thereby exhibiting high conductivity.

Examples of the dopant agent include protonic acids, transition metal halides, surfactants, phthalocyanines, porphyrins, amino acids, nucleic acids, and polyacrylic acids. Examples of such protonic acids include hydrochloric acid, sulfuric acid, hydrofluoric acid, perchloric acid, trichloroacetic acid, trifluoroacetic acid, and phosphoric acid. Examples of such transition metal halides include halogens and ferric chlorides. Examples of such surfactants include alkylsulfonate salt and alkyl benzene sulfonate. Examples of a compound that can be used as the dopant agent are shown in the above-mentioned Patent Document 2 and some books (for example, Katsumi Yoshino and Mitsuyoshi Onoda, "Kobunshi Erekutoronikusu" [Polymer Electronics], CORONA PUBLISHING CO, LTD., Tokyo, 1996).

One possible method of adding a dopant to the first to third conductive polymer layers is to add a dopant agent to a monomer-containing liquid or an oxidizing agent solution. In the case of adding a dopant agent to the oxidizing agent solution, it is possible to use a single compound (for example, a halogen, a transition metal halide, or a protonic acid) that can be used as both the oxidizing agent and the dopant agent, instead of using two different compounds.

Figure 2:
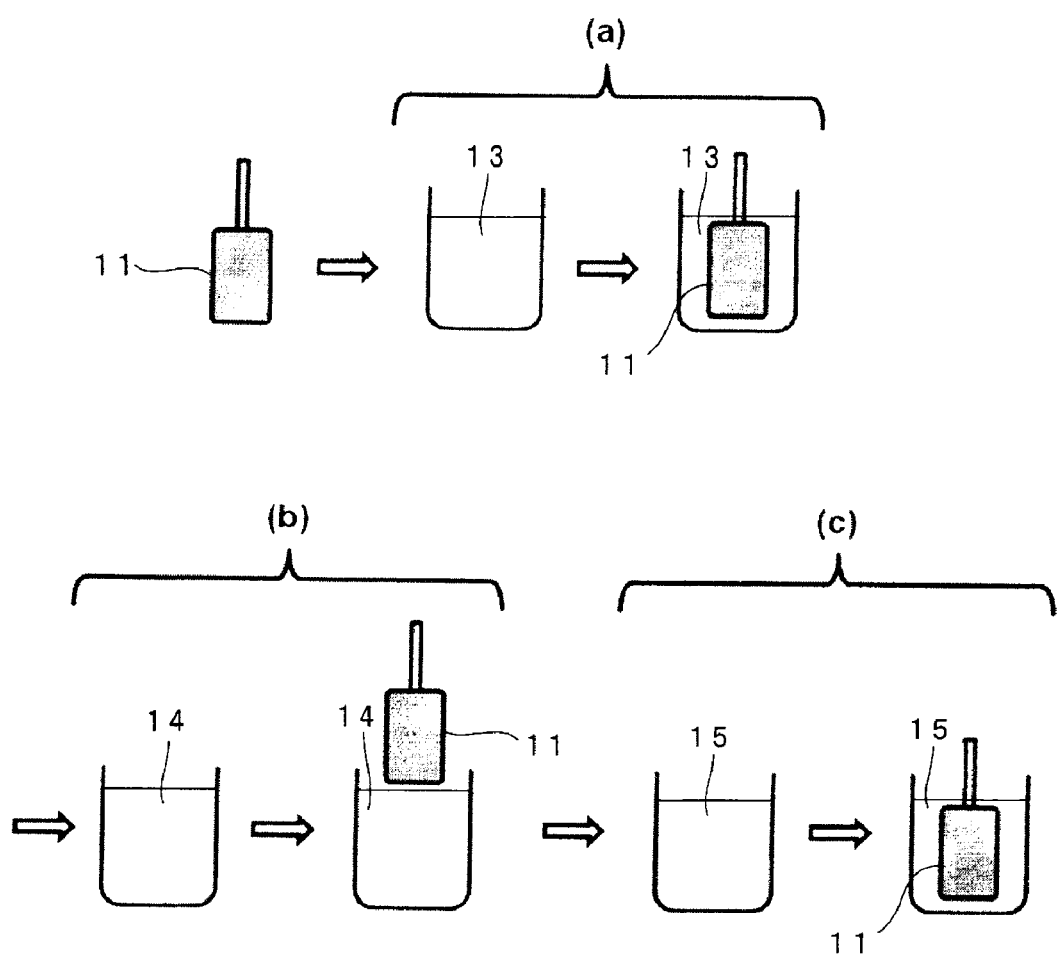
FIG. 2 is a schematic diagram of a method for manufacturing a solid electrolytic capacitor according to a Comparative Embodiment.

FIG. 2 is a schematic diagram of a method for manufacturing a conventional solid electrolytic capacitor including a conventional conductive polymer layer. In the step (a), the anode body 11 is soaked in the oxidizing agent solution 13 and then raised therefrom. In the step (b), the anode body 11 having the oxidizing agent solution adhered thereto is held above the monomer-containing liquid 14, and is brought into contact with the monomer vapor from the liquid 14. This results in the polymerization of the monomer by gas-phase chemical polymerization.

In the step (c), the anode body 11 having the conductive polymer layer formed by gas-phase chemical polymerization is soaked in the monomer-containing liquid 15, thereby polymerizing the monomer by electrolytic polymerization.

In this conventional method, especially when made of fine powder, the anode body 11 has small pores. When the monomer-containing liquid is introduced into the pores of the anode body 11 in the step (b), the monomer is polymerized inside the pores and closes the pores before the liquid permeates into the anode body 11. This makes it impossible to form a uniform and dense conductive polymer layer in the anode body 11.

In the present invention, on the other hand, the anode body is soaked in the monomer-containing liquid first to make the monomer adhere to the surface of the dielectric layer of the anode body, and then is subjected to liquid-phase chemical polymerization and gas-phase chemical polymerization in that order. As a result, the first and second conductive polymer layers can be formed uniformly and densely in the anode body, allowing the manufacture of a solid electrolytic capacitor having a large capacitance.

Figure 7:
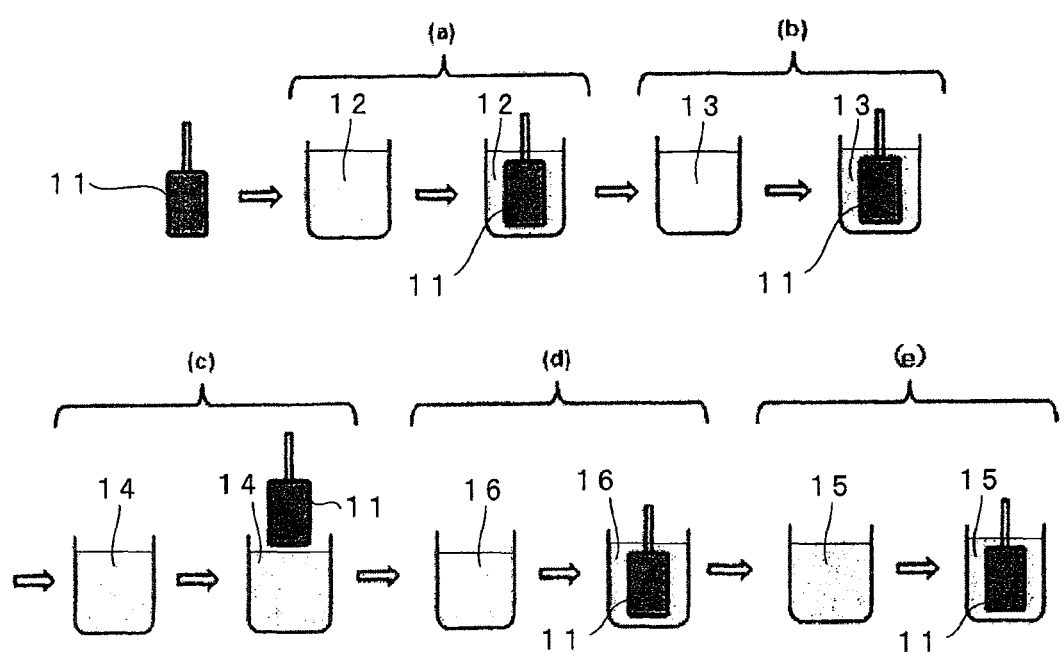
FIG. 7 is a schematic diagram of a method for manufacturing a solid electrolytic capacitor according to another embodiment of the present invention.

FIG. 7 is a schematic diagram of a method for manufacturing a solid electrolytic capacitor according to another embodiment of the present invention.

The present embodiment includes a step of soaking the anode body 11 having the second conductive polymer layer in a dopant agent-containing solution 16 between the steps (c) and (d) of the embodiment shown in FIG. 1.

The steps (a), (b), and (c) are equal to the steps (a), (b), and (c), respectively, shown in FIG. 1. The step (e) in the present embodiment is substantially the same as the step (d) shown in FIG. 1.

In the step (d) of the present embodiment, the dopant agent-containing solution 16 is prepared. The dopant agent is not particularly limited, and can be anything mentioned above. The solvent to dissolve the dopant agent is not particularly limited, and examples of the solvent include water, ethanol, acetone, and acetonitrile. A concentration of the dopant agent in the dopant agent-containing solution 16 is preferably in the range of 1 to 40 wt %.

The soaking of the anode body 11 in the dopant agent-containing solution 16 is generally performed at room temperature, but, when necessary, the dopant agent-containing solution 16 may be heated before use. The soaking time in the solution 16 is not particularly limited, and may be in the range of one second to 24 hours.

The anode body 11 having the second conductive polymer layer is soaked in the dopant agent-containing solution 16, is raised therefrom, and is dried by volatizing the solvent from the solution adhered to the surface of the anode body 11. The drying conditions are not particularly limited, and are properly determined according to, for example, the type of the solvent used in the solution.

After the drying, the anode body 11 is soaked in the liquid 15 containing the conductive-polymer monomer, and performs the step (e).

In the present embodiment, the anode body 11 having the second conductive polymer layer formed on the first conductive polymer layer is soaked in the dopant agent-containing solution 16. After this step, the anode body 11 is soaked in the liquid 15 containing the conductive-polymer monomer so as to polymerize the monomer by electrolytic polymerization, thereby forming the third conductive polymer layer on the second conductive polymer layer.

In the present embodiment, the anode body 11 is soaked in the dopant agent-containing solution after forming the second conductive polymer layer, allowing the second conductive polymer layer and/or the third conductive polymer layer to contain the dopant agent. This further increases the capacitance of the solid electrolytic capacitor.

EXAMPLES

The present invention will be described in specific examples as follows, but is not limited thereto.

In the following Examples and Comparative Examples, the anode body is a sintered body made of tantalum (Ta).

Example 1

A solid electrolytic capacitor of Example 1 was produced as follows. First, Ta metal powder was prepared which has a CV value of 171,789 μF·V/g. The CV value is the product of the capacity of the sintered body having a dielectric layer and the electrolysis voltage. This Ta metal powder was molded with an anode lead embedded inside, and was sintered in a vacuum at around 1200° C., thereby forming the anode body. The anode body used in Example 1 has a weight (density) of 6.0 g/cm$^3$ per unit volume after being sintered.

Next, the anode body was anodized in an aqueous phosphoric solution to form a dielectric layer. The anode body having the dielectric layer was soaked for ten minutes in an aqueous solution containing a coupling agent, taken out of the solution, and dried to form a coupling agent layer on the dielectric layer.

Examples of the coupling agent include silane coupling agents, carboxylic acid coupling agents, and phosphoric acid coupling agents. Examples of such silane coupling agents include aminopropyltriethoxysilane, octadecyltriethoxysilane, n-propyltrichlorosilane, mercaptopropyltrimethoxysilane, dimethoxydiphenylsilane, and methylphenyldichlorosilane. Examples of such carboxylic acid coupling agents include carboxylated polybutadiene and carboxylated polyisoprene. Examples of such phosphoric acid coupling agents include n-propyl phosphate, phosphoric acid monooctyl ester, phosphoric acid mono(2,6-dimethyl-7-octenyl)ester, phosphoric acid mono(6-mercaptohexyl)ester, and phosphoric acid mono(2-methacryloxypropyl)ester. In the following Examples and Comparative Examples, a silane coupling agent was used as the coupling agent.

Next, the anode body having the coupling agent layer was soaked for ten minutes in a liquid composed of 100% by mass of a pyrrole monomer, and then was soaked for ten minutes in an oxidizing agent solution containing a dopant agent. Next, the anode body was taken out of the solution and held for 60 minutes near and above the liquid level of a solution composed of 100% by mass of the pyrrole monomer. As a result, first and second conductive polymer layers made of polypyrrole were formed on the dielectric layer in that order by liquid-phase chemical polymerization and gas-phase chemical polymerization, respectively.

Next, the anode body was soaked in an aqueous solution containing sodium alkylnaphthalenesulfonate (concentration: 0.05 mol/L) as a dopant agent, and a pyrrole monomer (concentration: 0.1 mol/L). The alkyl group has an average of about 18 carbon atoms. After this, an electric current was supplied to the aqueous solution using the first and second conductive polymer layers as a positive electrode, thereby forming a third conductive polymer layer on the first and second conductive polymer layers by electrolytic chemical polymerization. Then, the anode body was washed and dried to complete a capacitor element.

In this capacitor element, a carbon layer and a silver layer were formed on the third conductive polymer layer as described above, and metal terminal strips were fixed to the anode lead and the silver layer. Then, an outer package made, for example, of epoxy resin was attached to the capacitor element. Thus, the solid electrolytic capacitor was completed.

Example 2

A solid electrolytic capacitor of Example 2 was produced as follows. The same Ta powder as used in Example 1 was sintered so that the resulting Ta sintered body had a CV value of 171,789 μF·V/g and a weight (density) of 6.0 g/cm$^3$ per unit volume. This sintered body was used as an anode body.

The anode body was anodized in an aqueous phosphoric solution to form a dielectric layer. The anode body having the dielectric layer was soaked for ten minutes in an aqueous solution containing a coupling agent, taken out of the solution, and dried to form a coupling agent layer.

Next, the anode body having the coupling agent layer was soaked for ten minutes in an aqueous solution containing sodium alkylnaphthalenesulfonate (concentration: 0.05 mol/L) as a dopant agent and a pyrrole monomer (concentration: 90% by mass). The alkyl group has an average of about 18 carbon atoms. After this, the anode body was soaked for ten minutes in an oxidizing agent solution containing a dopant agent. The anode body was taken out of the solution and held for 60 minutes near and above the liquid level of a liquid composed of 100% by mass of a pyrrole monomer. As a result, first and second conductive polymer layers were formed on the dielectric layer in that order by liquid-phase chemical polymerization and gas-phase chemical polymerization, respectively.

The steps subsequent to the formation of a third conductive polymer layer are the same as in Example 1.

Example 3

A solid electrolytic capacitor of Example 3 was produced as follows. The same Ta powder as used in Example 1 was sintered so that the resulting Ta sintered body had a CV value of 171,789 μF·V/g and a weight (density) of 6.0 g/cm$^3$ per unit volume. This sintered body was used as an anode body.

The anode body was anodized in an aqueous phosphoric solution to form a dielectric layer. The anode body having the dielectric layer was soaked for ten minutes in an aqueous solution containing a coupling agent, taken out of the solution, and dried to form a coupling agent layer.

Next, the anode body having the coupling agent layer was soaked for ten minutes in an aqueous solution containing sodium alkylnaphthalenesulfonate (concentration: 0.05 mol/L) as a dopant agent and a pyrrole monomer (concentration: 50% by mass). The alkyl group has an average of about 18 carbon atoms. After this, the anode body was soaked for ten minutes in an oxidizing agent solution containing a dopant agent. The anode body was taken out of the solution and held for 60 minutes near and above the liquid level of a liquid composed of 100% by mass of a pyrrole monomer. As a result, first and second conductive polymer layers were formed on the dielectric layer in that order by liquid-phase chemical polymerization and gas-phase chemical polymerization, respectively.

The steps subsequent to the formation of a third conductive polymer layer are the same as in Example 1.

Example 4

A solid electrolytic capacitor of Example 4 was produced as follows. The same Ta powder as used in Example 1 was sintered so that the resulting Ta sintered body had a CV value of 171,789 μF·V/g and a weight (density) of 6.0 g/cm$^3$ per unit volume. This sintered body was used as an anode body.

The anode body was anodized in an aqueous phosphoric solution to form a dielectric layer. The anode body having the dielectric layer was soaked for ten minutes in an aqueous solution containing a coupling agent, taken out of the solution, and dried to form a coupling agent layer.

Next, the anode body having the coupling agent layer was soaked for ten minutes in an aqueous solution containing sodium alkylnaphthalenesulfonate (concentration: 0.05 mol/L) as a dopant agent and a pyrrole monomer (concentration: 20% by mass). The alkyl group has an average of about 18 carbon atoms. After this, the anode body was soaked for ten minutes in an oxidizing agent solution containing a dopant agent. The anode body was taken out of the solution and held for 60 minutes near and above the liquid level of a liquid composed of 100% by mass of a pyrrole monomer. As a result, first and second conductive polymer layers were formed on the dielectric layer in that order by liquid-phase chemical polymerization and gas-phase chemical polymerization, respectively.

The steps subsequent to the formation of a third conductive polymer layer are the same as in Example 1.

Example 5

A solid electrolytic capacitor of Example 5 was produced as follows. The same Ta powder as used in Example 1 was sintered so that the resulting Ta sintered body had a CV value of 171,789 μF·V/g and a weight (density) of 6.0 g/cm$^3$ per unit volume. This sintered body was used as an anode body.

The anode body was anodized in an aqueous phosphoric solution to form a dielectric layer. The anode body having the dielectric layer was soaked for ten minutes in an aqueous solution containing a coupling agent, taken out of the solution, and dried to form a coupling agent layer.

Next, the anode body having the coupling agent layer was soaked for ten minutes in an aqueous solution containing sodium alkylnaphthalenesulfonate (concentration: 0.05 mol/L) as a dopant agent and a pyrrole monomer (concentration: 1% by mass). The alkyl group has an average of about 18 carbon atoms. After this, the anode body was soaked for ten minutes in an oxidizing agent solution containing a dopant agent. The anode body was taken out of the solution and held for 60 minutes near and above the liquid level of a liquid composed of 100% by mass of a pyrrole monomer. As a result, first and second conductive polymer layers were formed on the dielectric layer in that order by liquid-phase chemical polymerization and gas-phase chemical polymerization, respectively.

The steps subsequent to the formation of a third conductive polymer layer are the same as in Example 1.

Example 6

A solid electrolytic capacitor of Example 6 was produced as follows. The same Ta powder as used in Example 1 was sintered so that the resulting Ta sintered body had a CV value of 171,789 μF·V/g and a weight (density) of 6.0 g/cm$^3$ per unit volume. This sintered body was used as an anode body.

The anode body was anodized in an aqueous phosphoric solution to form a dielectric layer. The anode body having the dielectric layer was soaked for ten minutes in an aqueous solution containing a coupling agent, taken out of the solution, and dried to form a coupling agent layer.

Next, the anode body having the coupling agent layer was soaked for ten minutes in an aqueous solution containing sodium alkylnaphthalenesulfonate (concentration: 0.05 mol/L) as a dopant agent and a pyrrole monomer (concentration: 0.1% by mass). The alkyl group has an average of about 18 carbon atoms. After this, the anode body was soaked for ten minutes in an oxidizing agent solution containing a dopant agent. The anode body was taken out of the solution and held for 60 minutes near and above the liquid level of a liquid composed of 100% by mass of a pyrrole monomer. As a result, first and second conductive polymer layers were formed on the dielectric layer in that order by liquid-phase chemical polymerization and gas-phase chemical polymerization, respectively.

The steps subsequent to the formation of a third conductive polymer layer are the same as in Example 1.

Example 7

A solid electrolytic capacitor of Example 7 was produced as follows. The same Ta powder as used in Example 1 was sintered so that the resulting Ta sintered body had a CV value of 171,789 μF·V/g and a weight (density) of 6.0 g/cm³ per unit volume. This sintered body was used as an anode body. Example 7 differs from Example 1 in that the surface treatment using a coupling agent is not performed in the manufacture of the solid electrolytic capacitor. In Example 7, the Ta sintered body having the dielectric layer was soaked for ten minutes in a liquid composed of 100% by mass of a pyrrole monomer and then soaked for ten minutes in an oxidizing agent solution containing a dopant agent. The anode body was taken out of the solution and held for 60 minutes near and above the liquid level of a liquid composed of 100% by mass of a pyrrole monomer. As a result, first and second conductive polymer layers were formed on the dielectric layer in that order by liquid-phase chemical polymerization and gas-phase chemical polymerization, respectively.

The steps subsequent to the formation of a third conductive polymer layer are the same as in Example 1.

Example 8

A solid electrolytic capacitor of Example 8 was produced as follows. The same Ta powder as used in Example 1 was sintered so that the resulting Ta sintered body had a CV value of 171,789 μF·V/g and a weight (density) of 5.8 g/cm³ per unit volume. This sintered body was used as an anode body. The steps subsequent to the formation of the dielectric layer are the same as in Example 7.

Example 9

A solid electrolytic capacitor of Example 9 was produced as follows. The same Ta powder as used in Example 1 was sintered so that the resulting Ta sintered body had a CV value of 171,789 μF·V/g and a weight (density) of 5.6 g/cm³ per unit volume. This sintered body was used as an anode body. The steps subsequent to the formation of the dielectric layer are the same as in Example 7.

Example 10

A solid electrolytic capacitor of Example 10 was produced as follows. The same Ta powder as used in Example 1 was sintered so that the resulting Ta sintered body had a CV value of 171,789 μF·V/g and a weight (density) of 5.4 g/cm³ per unit volume. This sintered body was used as an anode body. The steps subsequent to the formation of the dielectric layer are the same as in Example 7.

Example 11

A solid electrolytic capacitor of Example 11 was produced as follows. The same Ta powder as used in Example 1 was sintered so that the resulting Ta sintered body had a CV value of 171,789 μF·V/g and a weight (density) of 5.8 g/cm³ per unit volume. This sintered body was used as an anode body. The steps subsequent to the formation of the dielectric layer are the same as in Example 1.

Example 12

A solid electrolytic capacitor of Example 12 was produced as follows. The same Ta powder as used in Example 1 was sintered so that the resulting Ta sintered body had a CV value of 171,789 μF·V/g and a weight (density) of 5.6 g/cm³ per unit volume. This sintered body was used as an anode body. The steps subsequent to the formation of the dielectric layer are the same as in Example 1.

Example 13

A solid electrolytic capacitor of Example 13 was produced as follows. The same Ta powder as used in Example 1 was sintered so that the resulting Ta sintered body had a CV value of 171,789 μF·V/g and a weight (density) of 5.4 g/cm³ per unit volume. This sintered body was used as an anode body. The steps subsequent to the formation of the dielectric layer are the same as in Example 1.

Example 14

A solid electrolytic capacitor of Example 14 was produced as follows. The same Ta powder as used in Example 1 was sintered so that the resulting Ta sintered body had a CV value of 145,382 μF·V/g and a weight (density) of 6.0 g/cm³ per unit volume. This sintered body was used as an anode body. The steps subsequent to the formation of the dielectric layer are the same as in Example 1.

Example 15

A solid electrolytic capacitor of Example 15 was produced as follows. The same Ta powder as used in Example 1 was sintered so that the resulting Ta sintered body had a CV value of 145,382 μF·V/g and a weight (density) of 5.8 g/cm³ per unit volume. This sintered body was used as an anode body. The steps subsequent to the formation of the dielectric layer are the same as in Example 1.

Example 16

A solid electrolytic capacitor of Example 16 was produced as follows. The same Ta powder as used in Example 1 was sintered so that the resulting Ta sintered body had a CV value of 145,382 μF·V/g and a weight (density) of 5.6 g/cm³ per unit volume. This sintered body was used as an anode body. The steps subsequent to the formation of the dielectric layer are the same as in Example 1.

Example 17

A solid electrolytic capacitor of Example 17 was produced as follows. The same Ta powder as used in Example 1 was sintered and the resulting Ta sintered body having a CV value of 145,382 μF·V/g and a weight (density) of 5.4 g/cm³ per unit volume after sintering was used as an anode body. The steps subsequent to the formation of the dielectric layer are the same as in Example 1.

Example 18

A solid electrolytic capacitor of Example 18 was produced as follows. The same Ta powder as used in Example 1 was sintered so that the resulting Ta sintered body had a CV value of 118,925 μF·V/g and a weight (density) of 6.0 g/cm³ per unit volume. This sintered body was used as an anode body. The steps subsequent to the formation of the dielectric layer are the same as in Example 1.

Example 19

A solid electrolytic capacitor of Example 19 was produced as follows. The same Ta powder as used in Example 1 was sintered so that the resulting Ta sintered body had a CV value of 118,925 µF·V/g and a weight (density) of 5.8 g/cm³ per unit volume. This sintered body was used as an anode body. The steps subsequent to the formation of the dielectric layer are the same as in Example 1.

Example 20

A solid electrolytic capacitor of Example 20 was produced as follows. The same Ta powder as used in Example 1 was sintered so that the resulting Ta sintered body had a CV value of 118,925 µF·V/g and a weight (density) of 5.6 g/cm³ per unit volume. This sintered body was used as an anode body. The steps subsequent to the formation of the dielectric layer are the same as in Example 1.

Example 21

A solid electrolytic capacitor of Example 21 was produced as follows. The same Ta powder as used in Example 1 was sintered so that the resulting Ta sintered body had a CV value of 118,925 µF·V/g and a weight (density) of 5.4 g/cm³ per unit volume. This sintered body was used as an anode body. The steps subsequent to the formation of the dielectric layer are the same as in Example 1.

Example 22

A solid electrolytic capacitor of Example 22 was produced as follows. The same Ta powder as used in Example 1 was sintered so that the resulting Ta sintered body had a CV value of 171,789 µF·V/g and a weight (density) of 6.0 g/cm³ per unit volume. This sintered body was used as an anode body.

After forming a dielectric layer, a coupling agent layer, and first and second conductive polymer layers in the same manner as in Example 1, the anode body was soaked in an aqueous solution (concentration: 5 wt %) containing 2-naphthalenesulfonic acid as a dopant agent, taken out of the solution, and dried.

Then, the steps subsequent to the formation of a third conductive polymer layer were performed in the same manner as in Example 1.

In the present invention, as in this example, after the step of forming the second conductive polymer layer, it is possible to provide a step of soaking the anode body in a solution containing a dopant agent. After this step, a third conductive polymer layer is formed.

Thus, by soaking the anode body in the dopant agent-containing solution after the formation of the second conductive polymer layer, the manufactured solid electrolytic capacitor can have a larger capacitance, a smaller ESR, and a smaller leakage current.

Comparative Example 1

A solid electrolytic capacitor of Comparative Example 1 was produced as follows. The same Ta powder as used in Example 1 was sintered so that the resulting Ta sintered body had a CV value of 171,789 µF·V/g and a weight (density) of 6.0 g/cm³ per unit volume. This sintered body was used as an anode body.

Comparative Example 1 differs from Example 1 in that the surface treatment using a coupling agent is not performed and that a first polypyrrole layer is formed only by gas-phase chemical polymerization in the manufacture of the solid electrolytic capacitor. The production process of Comparative Example 1 is shown in FIG. 2. In Comparative Example 1, the anode body having a dielectric layer was soaked for ten minutes in an oxidizing agent solution containing a dopant agent (FIG. 2(a)). Then, the anode body was taken out of the solution, dried, and held for 60 minutes near and above the liquid level of a liquid composed of 100% by mass of a pyrrole monomer (FIG. 2(b)). As a result, the first polypyrrole layer was formed on the dielectric layer by gas-phase chemical polymerization. The steps subsequent to the formation of a second polypyrrole layer (corresponding to the third conductive polymer layer) are the same as in Example 1.

Comparative Example 2

A solid electrolytic capacitor of Comparative Example 2 was produced as follows. The same Ta powder as used in Example 1 was sintered so that the resulting Ta sintered body had a CV value of 171,789 µF·V/g and a weight (density) of 5.8 g/cm³ per unit volume. This sintered body was used as an anode body. The steps subsequent to the formation of the dielectric layer are the same as in Comparative Example 1.

Comparative Example 3

A solid electrolytic capacitor of Comparative Example 3 was produced as follows. The same Ta powder as used in Example 1 was sintered so that the resulting Ta sintered body had a CV value of 171,789 µF·V/g and a weight (density) of 5.6 g/cm³ per unit volume. This sintered body was used as an anode body. The steps subsequent to the formation of the dielectric layer are the same as in Comparative Example 1.

Comparative Example 4

A solid electrolytic capacitor of Comparative Example 4 was produced as follows. The same Ta powder as used in Example 1 was sintered so that the resulting Ta sintered body had a CV value of 171,789 µF·V/g and a weight (density) of 5.4 g/cm³ per unit volume. This sintered body was used as an anode body. The steps subsequent to the formation of the dielectric layer are the same as in Comparative Example 1.

Comparative Example 5

A solid electrolytic capacitor of Comparative Example 5 was produced as follows. The same Ta powder as used in Example 1 was sintered so that the resulting Ta sintered body had a CV value of 171,789 µF·V/g and a weight (density) of 6.0 g/cm³ per unit volume. This sintered body was used as an anode body. Comparative Example 5 differs from Example 1 in that the first polypyrrole layer is formed only by gas-phase chemical polymerization in the manufacture of the solid electrolytic capacitor. In Comparative Example 5, the Ta sintered body having a dielectric layer was soaked for ten minutes in an aqueous solution containing a coupling agent, taken out of the solution, and dried. Next, the anode body was soaked for ten minutes in an oxidizing agent solution containing a dopant agent, taken out of the solution, and dried. Then, the anode body was held for 60 minutes near and above the liquid level of a liquid composed of 100% by mass of a pyrrole monomer. As a result, the first polypyrrole layer was formed on the dielectric layer by gas-phase chemical polymerization. The steps subsequent to the formation of a second polypyrrole layer (corresponding to the third conductive polymer layer) are the same as in Example 1.

Comparative Example 6

A solid electrolytic capacitor of Comparative Example 6 was produced as follows. The same Ta powder as used in Example 1 was sintered so that the resulting Ta sintered body had a CV value of 171,789 μF·V/g and a weight (density) of 5.8 g/cm$^3$ per unit volume. This sintered body was used as an anode body. The steps subsequent to the formation of the dielectric layer are the same as in Comparative Example 5.

Comparative Example 7

A solid electrolytic capacitor of Comparative Example 7 was produced as follows. The same Ta powder as used in Example 1 was sintered so that the resulting Ta sintered body had a CV value of 171,789 μF·V/g and a weight (density) of 5.6 g/cm$^3$ per unit volume. This sintered body was used as an anode body. The steps subsequent to the formation of the dielectric layer are the same as in Comparative Example 5.

Comparative Example 8

A solid electrolytic capacitor of Comparative Example 8 was produced as follows. The same Ta powder as used in Example 1 was sintered so that the resulting Ta sintered body had a CV value of 171,789 μF·V/g and a weight (density) of 5.4 g/cm$^3$ per unit volume. This sintered body was used as an anode body. The steps subsequent to the formation of the dielectric layer are the same as in Comparative Example 5.

Comparative Example 9

A solid electrolytic capacitor of Comparative Example 9 was produced as follows. The same Ta powder as used in Example 1 was sintered so that the resulting Ta sintered body had a CV value of 171,789 μF·V/g and a weight (density) of 6.0 g/cm$^3$ per unit volume. This sintered body was used as an anode body.

The anode body was anodized in an aqueous phosphoric solution to form a dielectric layer. The anode body having the dielectric layer was soaked for ten minutes in an aqueous solution containing a coupling agent, taken out of the solution, and dried to form a coupling agent layer.

Next, the anode body having the coupling agent layer was soaked for ten minutes in an oxidizing agent solution containing a dopant agent. Then, the anode body was taken out of the solution and held for 60 minutes near or above the liquid level of a liquid composed of 100% by mass of a pyrrole monomer, thereby subjecting polypyrrole to gas-phase chemical polymerization on the dielectric layer. Then, the anode body was soaked in a liquid composed of 100% by mass of a pyrrole monomer, thereby subjecting the polypyrrole to liquid-phase chemical polymerization. As a result, a first polypyrrole layer was formed on the dielectric layer.

Next, the anode body was soaked in an aqueous solution containing sodium alkylnaphthalenesulfonate (concentration: 0.05 mol/L) as a dopant agent and a pyrrole monomer (concentration: 0.1 mol/L). The alkyl group has an average of about 18 carbon atoms. After this, an electric current was supplied to the aqueous solution using the first polypyrrole layer as a positive electrode, thereby forming a second polypyrrole layer on the first polypyrrole layer by electrolytic chemical polymerization. Then, the anode body was washed and dried to complete a capacitor element. The steps subsequent to the formation of the silver layer are the same as in Example 1.

The outline of the methods for manufacturing the capacitors of Examples 1 to 22 and Comparative Examples 1 to 9 are shown in Table 1, and the electrical characteristics of the capacitors manufactured by these methods are shown in Table 2. Note that the capacitances were measured at 120 Hz, and the equivalent series resistances (ESRs) were measured at 100 kHz. The CV values were measured using the capacitance in a 20% sulfuric acid aqueous solution as a reference.

The leakage currents were measured at the current value obtained 40 seconds after the application of a rated voltage. The values of these leakage currents are shown in Table 2 as relative values when the value in Comparative Example 1 is 100.

TABLE 1

|  | CV value (μF · V/g) | Density after sintering (g/cm3) | Coupling agent | Liquid-phase chemical polymerization | Liquid to be soaked in | Gas-phase chemical polymerization |
|---|---|---|---|---|---|---|
| Example 1 | 171,789 | 6.0 | Added | ○ | 100% by mass of pyrrole | ○ |
| Example 2 | 171,789 | 6.0 | Added | ○ | 90% by mass of pyrrole | ○ |
| Example 3 | 171,789 | 6.0 | Added | ○ | 50% by mass of pyrrole | ○ |
| Example 4 | 171,789 | 6.0 | Added | ○ | 20% by mass of pyrrole | ○ |
| Example 5 | 171,789 | 6.0 | Added | ○ | 1% by mass of pyrrole | ○ |
| Example 6 | 171,789 | 6.0 | Added | ○ | 0.1% by mass of pyrrole | ○ |
| Example 7 | 171,789 | 6.0 | Not added | ○ | 100% by mass of pyrrole | ○ |
| Example 8 | 171,789 | 5.8 | Not added | ○ | 100% by mass of pyrrole | ○ |
| Example 9 | 171,789 | 5.6 | Not added | ○ | 100% by mass of pyrrole | ○ |
| Example 10 | 171,789 | 5.4 | Not added | ○ | 100% by mass of pyrrole | ○ |
| Example 11 | 171,789 | 5.8 | Added | ○ | 100% by mass of pyrrole | ○ |
| Example 12 | 171,789 | 5.6 | Added | ○ | 100% by mass of pyrrole | ○ |
| Example 13 | 171,789 | 5.4 | Added | ○ | 100% by mass of pyrrole | ○ |
| Example 14 | 145,382 | 6.0 | Added | ○ | 100% by mass of pyrrole | ○ |
| Example 15 | 145,382 | 5.8 | Added | ○ | 100% by mass of pyrrole | ○ |
| Example 16 | 145,382 | 5.6 | Added | ○ | 100% by mass of pyrrole | ○ |
| Example 17 | 145,382 | 5.4 | Added | ○ | 100% by mass of pyrrole | ○ |
| Example 18 | 118,925 | 6.0 | Added | ○ | 100% by mass of pyrrole | ○ |
| Example 19 | 118,925 | 5.8 | Added | ○ | 100% by mass of pyrrole | ○ |
| Example 20 | 118,925 | 5.6 | Added | ○ | 100% by mass of pyrrole | ○ |
| Example 21 | 118,925 | 5.4 | Added | ○ | 100% by mass of pyrrole | ○ |
| Example 22 | 171,789 | 6.0 | Added | ○ | 100% by mass of pyrrole | ○** |
| Comparative Example 1 | 171,789 | 6.0 | Not added | x | — | ○ |
| Comparative Example 2 | 171,789 | 5.8 | Not added | x | — | ○ |
| Comparative Example 3 | 171,789 | 5.6 | Not added | x | — | ○ |
| Comparative Example 4 | 171,789 | 5.4 | Not added | x | — | ○ |
| Comparative Example 5 | 171,789 | 6.0 | Added | x | — | ○ |

TABLE 1-continued

|  | CV value (µF·V/g) | Density after sintering (g/cm3) | Coupling agent | Liquid-phase chemical polymerization | Liquid to be soaked in | Gas-phase chemical polymerization |
|---|---|---|---|---|---|---|
| Comparative Example 6 | 171,789 | 5.8 | Added | x | — | o |
| Comparative Example 7 | 171,789 | 5.6 | Added | x | — | o |
| Comparative Example 8 | 171,789 | 5.4 | Added | x | — | o |
| Comparative Example 9 | 171,789 | 6.0 | Added | o* | 100% by mass of pyrrole | o* |

*In Comparative Example 9, gas-phase chemical polymerization was followed by liquid-phase chemical polymerization
**Soaked in a dopant solution after gas-phase chemical polymerization

TABLE 2

|  | Capacitance (µF) | ESR (mΩ) | Leakage current |
|---|---|---|---|
| Example 1 | 45.4 | 86 | 89 |
| Example 2 | 45.3 | 82 | 63 |
| Example 3 | 44.9 | 86 | 68 |
| Example 4 | 44.4 | 89 | 58 |
| Example 5 | 43.4 | 80 | 105 |
| Example 6 | 39.1 | 92 | 100 |
| Example 7 | 39.4 | 89 | 100 |
| Example 8 | 39.9 | 89 | 79 |
| Example 9 | 40.1 | 93 | 95 |
| Example 10 | 40.3 | 93 | 63 |
| Example 11 | 44.5 | 90 | 84 |
| Example 12 | 42.3 | 95 | 74 |
| Example 13 | 41.2 | 87 | 68 |
| Example 14 | 43.5 | 88 | 89 |
| Example 15 | 42.1 | 82 | 121 |
| Example 16 | 41.1 | 87 | 74 |
| Example 17 | 39.5 | 91 | 100 |
| Example 18 | 40.1 | 89 | 84 |
| Example 19 | 40.5 | 92 | 68 |
| Example 20 | 39.8 | 90 | 84 |
| Example 21 | 39.0 | 91 | 84 |
| Example 22 | 46.4 | 85 | 79 |
| Comparative Example 1 | 32.6 | 91 | 100 |
| Comparative Example 2 | 35.3 | 96 | 95 |
| Comparative Example 3 | 37.5 | 98 | 95 |
| Comparative Example 4 | 39.2 | 93 | 111 |
| Comparative Example 5 | 36.1 | 89 | 111 |
| Comparative Example 6 | 37.5 | 95 | 153 |
| Comparative Example 7 | 38.7 | 92 | 163 |
| Comparative Example 8 | 39.1 | 92 | 137 |
| Comparative Example 9 | 38.3 | 98 | 147 |

As apparent from the results shown in Tables 1 and 2, Examples 1 to 22 of the present invention showed high capacitances.

Thus, the present invention can manufacture a solid electrolytic capacitor having a large capacitance.

Further, as apparent from the results shown in Tables 1 and 2, according to the present invention, it is possible to manufacture a solid electrolytic capacitor in which a capacitance increases and at least one of equivalent series resistance (ESR) and leakage current decreases.

Figure 3:
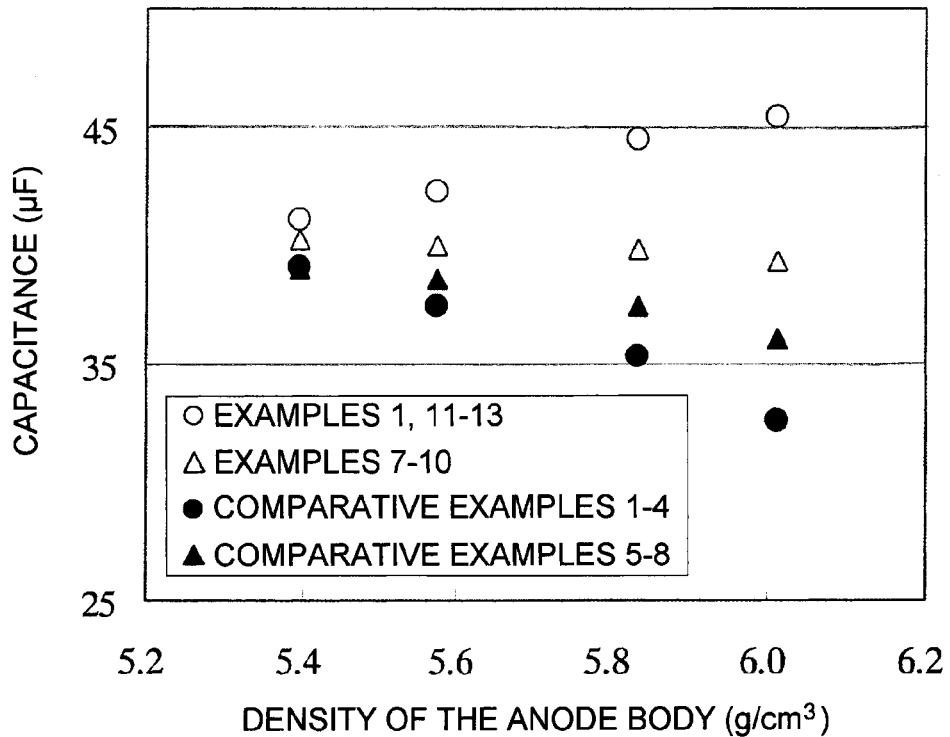
FIG. 3 shows the relation between the density of an anode body and the capacitance.

FIG. 3 shows the relation between the capacitance and the weight (density) of the anode body per unit volume in each of Examples 1 and 7 to 13 and Comparative Examples 1 to 8.

As apparent from FIG. 3, the difference in capacitance between Examples and Comparative Examples increases with increasing density of the anode body. This means that the effect of the present invention becomes more apparent with increasing density of the anode body. The reason for this is considered as follows. In Comparative Examples, it becomes harder to form an excellent conductive polymer layer in the pores (spaces) of the anode body as the anode body increases its density and the pores (spaces) of the porous body, which is a sintered body decreases. In contrast, in the present invention, it is possible to form a uniform and dense conductive polymer layer inside the anode body even when the pores (spaces) of the anode body are small.

Figure 4:
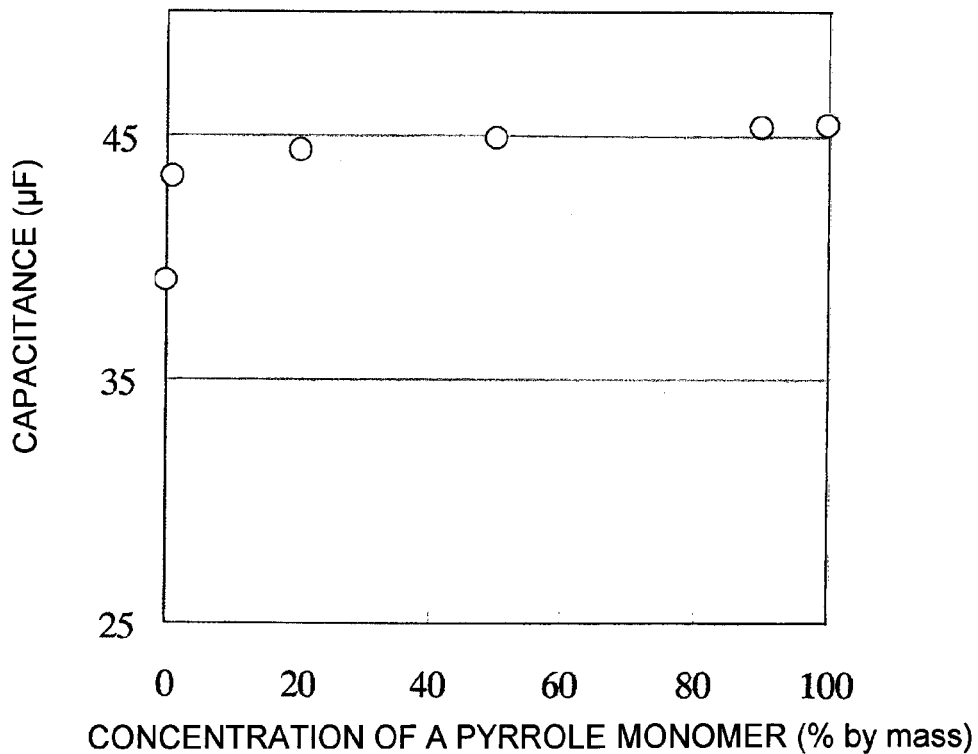
FIG. 4 shows the relation between the concentration of a pyrrole monomer and the capacitance.

FIG. 4 shows the relation between the capacitance and the concentration of the pyrrole monomer in the pyrrole monomer-containing liquid in which the anode body having the coupling agent layer is soaked as described in Examples 1 to 6.

As apparent from FIG. 4, the concentration of the monomer in the monomer-containing liquid in which the anode body is soaked for liquid-phase chemical polymerization is preferably not less than 1 wt %, and more preferably not less than 90 wt %.

As apparent from the comparison between Example 1 and Example 22, it is possible to further increase the capacitance and to further decrease the ESR and the leakage current by the following method. The second conductive polymer layer is formed by gas-phase chemical polymerization. Next, the anode body is soaked in a dopant agent-containing solution to make the dopant agent adhere to the surface of the second conductive polymer layer. Then, the third conductive polymer layer is formed.

What is claimed is:

1. A method for manufacturing a solid electrolytic capacitor, comprising the steps of:
    forming a porous anode body;
    forming a dielectric layer on a surface of the anode body;
    soaking the anode body having the dielectric layer in a liquid containing a conductive-polymer monomer;
    forming a first conductive polymer layer on the dielectric layer by soaking the anode body that has been soaked in the liquid containing the conductive-polymer monomer in an oxidizing agent solution, thereby polymerizing the monomer by liquid-phase chemical polymerization;
    forming a second conductive polymer layer on the first conductive polymer layer by holding the anode body having the first conductive polymer layer in a vapor of a conductive-polymer monomer, thereby polymerizing the monomer by gas-phase chemical polymerization; and
    forming a third conductive polymer layer on the second conductive polymer layer by soaking the anode body having the second conductive polymer layer in a liquid containing a conductive-polymer monomer, thereby polymerizing the monomer by electrolytic polymerization.

2. The method for manufacturing a solid electrolytic capacitor according to claim 1, further comprising a step of forming a coupling agent layer on the dielectric layer after the step of forming the dielectric layer.

3. The method for manufacturing a solid electrolytic capacitor according to claim 1, wherein:
    the anode body is made of powder of a valve metal or an alloy thereof, the powder having a CV value of not less than 145,000 µF·V/g.

4. The method for manufacturing a solid electrolytic capacitor according to claim 1, wherein:
the anode body has a density of not less than 5.0 g/cm$^3$ after sintering.

5. The method for manufacturing a solid electrolytic capacitor according to claim 1, wherein:
a concentration of the monomer in the monomer-containing liquid is in the range of 1 to 100% by mass in the step of forming the first conductive polymer layer.

6. The method for manufacturing a solid electrolytic capacitor according to claim 1, wherein:
a concentration of the monomer in the monomer-containing liquid is 90% or more by mass in the step of forming the first conductive polymer layer.

* * * * *